United States Patent [19]

Fennemann

[11] 4,399,118

[45] Aug. 16, 1983

[54] PROCESS OF RECOVERING ANHYDROUS ZIRCONIUM TETRAFLUORIDE

[75] Inventor: Wolfgang Fennemann, Karben, Fed. Rep. of Germany

[73] Assignee: Metallgesellschaft Aktiengesellschaft, Frankfurt am Main, Fed. Rep. of Germany

[21] Appl. No.: 277,413

[22] Filed: Jun. 25, 1981

[30] Foreign Application Priority Data

Jul. 5, 1980 [DE]  Fed. Rep. of Germany ....... 3025607

[51] Int. Cl.³ .......................................... C01G 25/04
[52] U.S. Cl. ..................................... 423/489; 423/74; 423/82
[58] Field of Search ............... 423/74, 82, 489

[56] References Cited

U.S. PATENT DOCUMENTS

| | | | |
|---|---|---|---|
| 2,602,725 | 7/1952 | Wilhelm et al. | 423/489 |
| 2,635,037 | 4/1953 | Wilhelm et al. | 423/489 |
| 2,639,218 | 5/1953 | Andersen | 423/489 |
| 3,385,658 | 5/1968 | Broja et al. | 423/489 |
| 3,606,283 | 9/1971 | Weber | 423/489 |
| 3,702,883 | 11/1972 | Craigen et al. | 423/82 |

FOREIGN PATENT DOCUMENTS 719185  11/1954  United Kingdom ................ 423/489

OTHER PUBLICATIONS

Chemical Abstracts, May 6, 1974, vol. 80, Heft 18, Zusammenfassung 93038t, Columbus, Ohio (US) & CA-A-936 331 (Craigen William).

Chemical Abstracts, Band 77, Heft 8, 21, Aug. 1972, Zusammenfassung 50886d, Columbus, Ohio (US) & CA-A-899 029 (Craigen William).

*Primary Examiner*—Herbert T. Carter
*Attorney, Agent, or Firm*—Sprung, Horn, Kramer & Woods

[57]  ABSTRACT

An improved process for the recovery of substantially anhydrous zirconium tetrafluoride from an aqueous solution of hydrofluoric acid and zirconium fluoride is disclosed wherein the aqueous solution of hydrofluoric acid and zirconium fluoride is sprayed, preferably continuously, into a fluidized bed furnace having a bed comprising zirconium fluoride granules.

15 Claims, 1 Drawing Figure

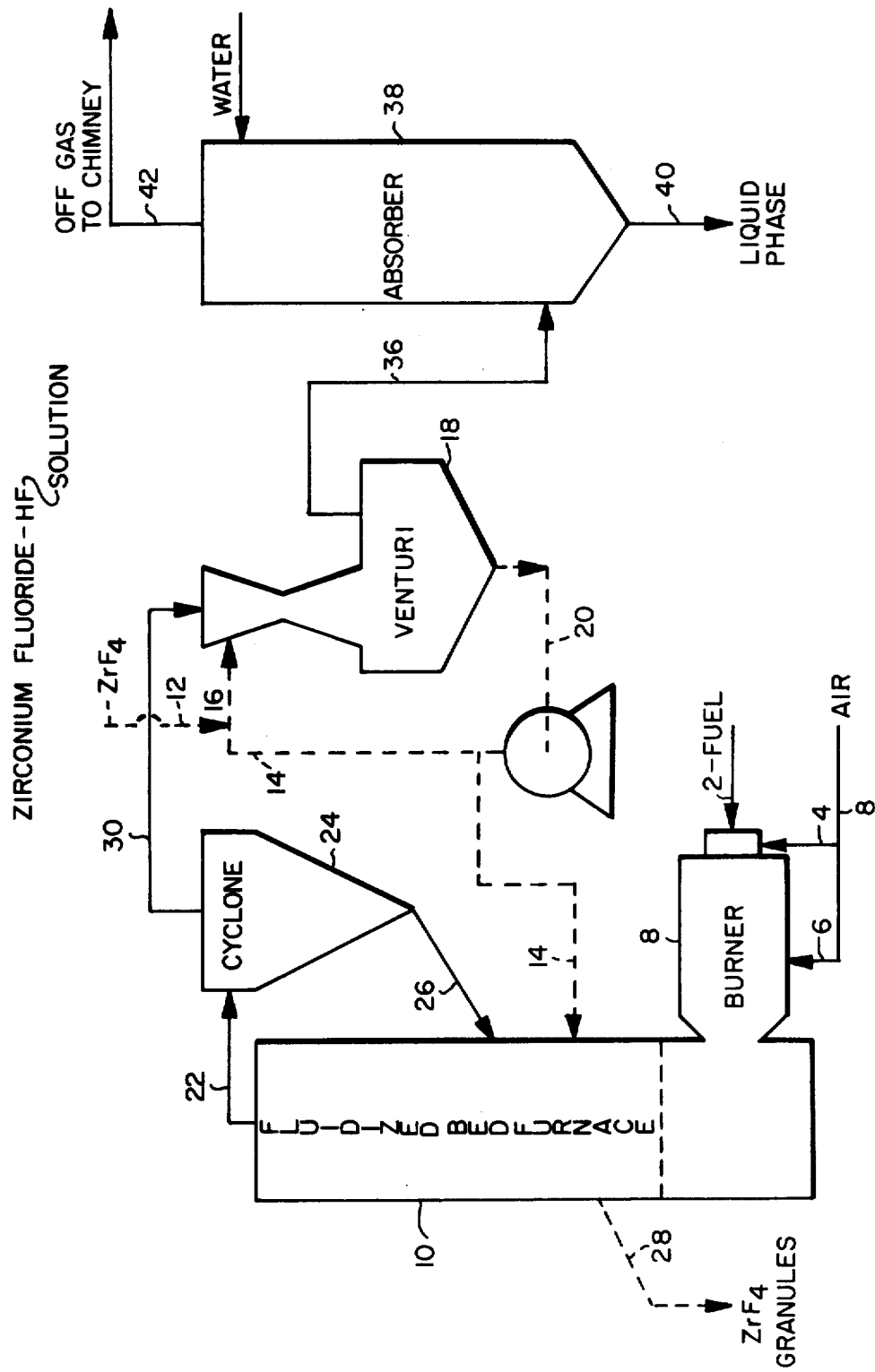

PROCESS OF RECOVERING ANHYDROUS ZIRCONIUM TETRAFLUORIDE

BACKGROUND OF THE INVENTION

1. Field of the Invention

This invention relates to a process of recovering substantially anhydrous zirconium tetrafluoride from an aqueous solution of hydrofluoride acid and zirconium fluoride.

2. Discussion of Prior Art

U.S. Pat. No. 2,635,037 discloses a process of producing zirconium tetrafluoride wherein zirconium fluoride which contains water of crystallization is produced from $ZrOCl_2 \cdot 8H_2O$ by its crystallizing precipitation from hydrofluoric acid and is dried and then calcined at 500° to 575° C. to produce anhydrous $ZrF_4$. That process has various disadvantages. Whenever a starting material consisting of $ZrOCl_2 \cdot 8H_2O$ is not available, that compound must be produced as an intermediate product. This involves additional costs and ecological problems.

The solution remaining after the separation of the zirconium fluoride contains all chlorine ions which have been introduced as well as unprecipitated zirconium and surplus fluorine which has been fed. The processing of that solution is very difficult and inevitably involves losses of Zr and F. Additionally the recovery of hydrofluoric acid is difficult because a separation from the hydrochloric acid is required initially. Finally, the intended calcining at relatively high temperature involves an unnecessarily high energy consumption.

U.S. Pat. No. 2,639,218 discloses the recovery of anhydrous zirconium tetrafluoride in a three-stage process, wherein $ZrO_2$ or $ZrOCl_2 \cdot 8H_2O$ is dissolved in an aqueous solution of hydrofluoric acid and the reaction product is dried and subsequently calcined. In case the starting product used in that process is the same as in the process according to U.S. Pat. No. 2,635,037 the same disadvantages arise. If the starting material consists of $ZrO_2$ or of metallic zirconium waste, the dissolved fluoride must be recovered by a crystallizing drying step. In that connection a disadvantage resides in that the zirconium fluoride is recovered in the form of very coarse lumps and adheres very firmly to the walls of the drying equipment. The removal from the wall and the disintegration, which is required for an economical calcining, involve unreasonably high costs, particularly because zirconium is a very hard material.

For this reason it is an object to provide a process for the recovery of substantially anhydrous zirconium tetrafluoride from an aqueous solution of hydrofluoric acid and zirconium fluoride which process is free from the disadvantages of the known processes and which can be carried out much more economically, in a simpler manner and with a lower consumption of energy.

SUMMARY OF INVENTION

In accordance with the invention, the aqueous solution of hydrofluoric acid and zirconium fluoride is continuously sprayed into a fluidized bed furnace having a bed consisting of zirconium fluoride granules.

According to a further preferred feature of the invention the solution is evaporated at 120° to 220° C., preferably at 140° to 200° C., and zirconium fluoride granules which contain water of crystallization are continuously withdrawn from the fluidized bed furnace and in a manner known per se are calcined at elevated temperatures to produce substantially anhydrous $ZrF_4$.

In a particularly desirable embodiment, the solution is evaporated in the fluidized bed furnace, and the zirconium fluoride which becomes available and contains water of crystallization is calcined in a single stage to form substantially anhydrous $ZrF_4$ granules, which are continuously withdrawn from the fluidized bed furnace. In that case the process is carried out at a temperature of 220° to 300° C., preferably 240° to 280° C.

According to a further preferred feature of the invention, a hot gas velocity of 1 to 4 m/s, based on an empty cross-section of the furnace is used, and zirconium fluoride granules are filled into the furnace up to a bed height of 0.2 to 0.8 m in the non fluidized state. Additional features and advantageous process steps will become apparent from the ensuing description and the following example in conjunction with the flow scheme on the accompanying drawing.

The process is preferably performed by using zirconium fluoride granules of particle size of 0.2 to 4 mm.

The process is preferably performed employing a hot gas velocity of 2 to 3 meters per second and filling the furnace with zirconium fluoride granules up to a bed height of 0.4 to 0.6 meters in the non-fluidized state.

The solution sprayed into the furnace preferably contains more than 200 grams zirconium per liter and preferably 300 to 450 grams zirconium per liter. Similarly, it preferably contains more than 50 grams HF per liter, more preferably 150 to 250 grams HF per liter.

Such a solution can be formed by dissolving metallic zirconium waste in an aqueous solution of hydrofluoric acid having a suitable concentration and removing undissolved components e.g. by filtration.

For economical and ecological reasons, steps are taken to remove any zirconium fluoride entrained in the effluent gas from the fluidized bed furnace. To such an end a cyclone can be used. The so supported $ZrF_4$ dust particle can be recycled to the furnace to build up the particular size. Preferably the $ZrF_4$ particles obtained have a particle size of at least 0.2 to 4 mm.

Alternatively the zirconium fluoride dust in the effluent can be removed by wet scrubbing the exhaust gas with an aqueous solution of hydrofluoric acid and the recovered zirconium fluoride can then be recycled. Preferably the aqueous solution of hydrofluoric acid and zirconium fluoride is preheated and subjected to preliminary evaporation in the wet scrubber and thereafter is subsequently sprayed into the fluidized bed furnace.

As a further alternative $ZrF_4$ dust can be initially collected using a cyclone and the gaseous effluent from the same subjected to a wet scrubbing of the type described to recover further $ZrF_2$ which can be recycled.

Hydrofluoric acid in the exhaust gas from the fluidized bed reactor can be recovered by scrubbing the same with water in a scrubbing cover. The resultant HF aqueous solution can be recycled.

BRIEF DESCRIPTION OF DRAWING

Referring to the annexed drawing, the same is a flow diagram of a particular mode for carrying out the invention.

DESCRIPTION OF SPECIFIC EMBODIMENT

Referring to the drawing herein, the process is conveniently carried out by introducing through line 2, a fuel and through lines 4 and 6 air into the burner 8 and producing a hot gas which serves as a fluidizing medium. The fluidized bed furnace 10 is fed with zirconium fluoride-HF solution via line 12, the solution being split and divided into lines 14 and 16. A portion of the solution can enter the venturi 18 and via such venturi and its exit line 20 be recombined with the zirconium fluoride solution in line 14 and thus sprayed into the fluidized bed of zirconium fluoride granules in furnace 10.

The zirconium fluoride-HF solution which contains also the more or less completely redissolved zirconium fluoride dust from venturi 18 is sprayed through line 14 into the fluidized bed of furnace 10 where it evaporates and ZrF$_4$ granules are produced. Via exhaust line 22 the hot gas containing evaporated water, HF and zirconium fluoride dust is passed through cyclone 24 to separate zirconium fluoride dust from gaseous media. The zirconium fluoride dust is recycled to fluidized bed furnace 10, via line 26. Zirconium fluoride granules are removed from the fluidized bed furnace via line 28. Exhaust gas emitted from cyclone 24 is passed through line 30 and into venturi 18 where the remaining zirconium fluoride dust is separated from the exhaust gas by injecting a portion of the zirconium fluoride-HF solution entering via line 12.

Gaseous effluent from the venturi 18 is separated therefrom the line 36 and enters an absorber 38 at the bottom thereof into which is introduced towards the top of the absorber 38 water or hydrofluoric acid of low concentration the purpose being to absorb the hydrogen fluoride of the effluent from venturi 18. Hydrofluoric acid with a concentration of about 20% is removed from the absorber 38 via line 40 and can be re-used to dissolve zirconium metal scrap. Via line 42 a clean off gas is removed and exits the plant via a chimney "not shown". The foregoing represents a convenient mode for carrying out the process of the invention.

In order to more fully illustrate the nature of the invention and manner of practicing the same, the following example is presented.

EXAMPLE

Zirconium metal scrap (sections of Zircalloy-IV tubes) were dissolved in hydrofluoric acid. The insoluble sponge metal was removed by filtration to leave a clear solution having the following compositions:

310 g/l Zr $\triangleq$ 568 g/l ZrF$_4$ 420 g/l total F $\triangleq$ 170 g/l free HF Density RT = 1.56 kg/l $\triangleq$ 822 g/l H$_2$O It is apparent that more than 99.9% of the Zr content of the starting material entered the solution.

The granulating plant consisted of a cylindrical fluidized bed furnace, which was 0.5 m in diameter ($\triangleq$ 0.2 m$^2$ grate area). A cyclone was used to collect dust from the exhaust gas of the furnace. The dust collected in the cyclone was returned into the fluidized bed furnace above the fluidized bed via a duct having an adequate slope.

25 m$^3$/h (NTP) natural gas (lower heating value = 34,000 KJ/m$^3$ (NTP) were burnt with 400 m$^3$/h (NTP) air (primary air) in a combustion chamber. 560 m$^3$/h (NTP) secondary air were admixed to the resulting flue gas to provide mixed gases at a temperature of about 600° C. These mixed gases were fed to the fluidized bed furnace.

The fluidized bed consisted of about 100 liters zirconium fluoride granules, which were continuously withdrawn at a rate of about 90 kg/h to maintain a continuous quantity of granules in the bed.

As the bulk density amounted to about 1.8 kg/l, the furnace contained about 180 kg solids and the mean residence time $$\frac{180 \text{ kg solids in furnace}}{\text{withdrawal of 90 kg/h solids}} = \text{about 2 hours}$$

The above-mentioned solution of zirconium fluoride was continuously fed into the venturi cycle (about 160 l/h) while the level in the venturi sump was maintained constant. In said cycle the solution was subjected to an evaporation of H$_2$O (utilization of the heat content of the exhaust gases from the furnace for a preliminary evaporation) and of zirconium fluoride dust and HF were dissolved in the solution. As a result, the solution was strengthened to the following average values:

About 800 g/l ZrF$_4$
about 250 g/l free HF
density about 1.75 kg/l.

A partial stream was branched from the concentrated solution which was circulated by a pump in the venturi cycle. That partial stream was fed to the fluidized bed at such a rate that a constant temperature of 250° C. was maintained in the fluidized bed. The required rate was about 125 l/h. The sensibile heat of the flue gases from the combustion chamber, which entered the fluidized bed at a temperature of 600° C. and was cooled to 250° C., was thus utilized for an evaporation of water.

The difference between the rates of the zirconium fluoride content of the solution fed to the venturi (160 l/h containing 568 g/l ZrF$_4$ = 91 kg/h ZrF$_4$) and of the solution fed to the furnace (125 l/h with 800 g/l ZrF$_4$ = 100 kg/h ZrF$_4$) shows that about 90% of the zirconium fluoride fed to the fluidized bed were granulated. A granulate yield of virtually 100% was obtained because non-granulated ZrF$_4$ was recycled in the venturi cycle.

The exhaust gas from the fluidized bed furnace was cooled to about 230° by radiant heat losses as it flowed through the cyclone to the venturi. The direct heat exchange in the venturi with the solution circulating therein resulted in a further cooling to about 110° C.

The gas that had been cooled to about 110° C. in the venturi was subsequently scrubbed with water in an absorber. As a result, the exhaust gas was cooled to about 75° C. and dilute hydrofluoric acid (about 20% HF) was thus formed. The concentration of the hydrofluoric acid can be varied in known manner by a suitable control of the absorption. The resulting hydrofluoric acid can be used to produce additional zirconium fluoride solution.

Comparable tests were conducted at 200° C. and 300° C. The resulting zirconium fluoride granules were analyzed:

| Granulating temperature °C. | Composition of Granules | | |
|---|---|---|---|
| | ZrF$_4$ % b.w. | ZrO$_2$ % b.w. | H$_2$O % b.w. |
| 200 | 91 | 1 | 8 |
| 250 | 90 | 8 | 2 |

| Granulating temperature °C. | Composition of Granules | | |
|---|---|---|---|
| | ZrF$_4$ % b.w. | ZrO$_2$ % b.w. | H$_2$O % b.w. |
| 300 | 70 | 29.5 | 0.5 |

It is apparent that the composition of the granules will depend on temperature and can be optimized as required for various purposes.

What is claimed is:

1. In a process for making substantially anhydrous zirconium tetrafluoride by drying zirconium fluoride dissolved in aqueous hydrofluoric acid and subsequently calcining the same to remove the water of crystallization in said zirconium fluoride, the improvement wherein the solution is sprayed continually into a fluidized bed oven with a bed of granulated zirconium fluoride and evaporated and zirconium fluoride containing water of crystallization is calcined in a fluidized bed oven with a bed of granulated zirconium fluoride at 220°–300° C. and drawn off from said fluidized bed oven, continually, as granulated product.

2. A process according to claim 1, wherein the process is carried out employing a hot gas velocity of 1 to 4 meters per second, based upon an empty cross section of the fluidized bed furnace, and zirconium fluoride granules are filled into the furnace up to a bed height of 0.2 to 0.8 m in the non fluidized state.

3. A process according to claim 2, wherein the hot gas velocity is 2 to 3 meters per second and the fluidized bed height corresponds to a non-fluidized bed height of 0.4 to 0.6 meters.

4. A process according to claim 1, wherein the solution of hydrofluoric acid and zirconium fluoride contains more than 200 grams zirconium per liter and more than 50 grams hydrogen fluoride per liter.

5. A process according to claim 4, wherein the solution sprayed into the furnace contains more than 300 grams zirconium per liter and more than 150 grams HF per liter.

6. A process according to claim 4, wherein the solution sprayed into the fluidized bed furnace is formed by dissolving metallic zirconium waste in an aqueous solution of hydrofluoric acid and removing undesired components.

7. A process according to claim 1, wherein zirconium fluoride dust contained in exhaust gas from a fluidized bed furnace is collected in a cyclone and recycled.

8. A process according to claim 1, wherein zirconium fluoride dust contained in the exhaust gas from the fluidized bed furnace is removed in a wet scrubber to which is added an aqueous solution of hydrofluoric acid and zirconium fluoride, the zirconium fluoride dust so recovered being recycled.

9. A process according to claim 8, wherein the aqueous solution of hydrofluoric acid and zirconium fluoride is preheated and subjected to preliminary evaporation in the wet scrubber and is only subsequently sprayed into the fluidized bed furnace.

10. A process according to claim 1, wherein the exhaust gas from the fluidized bed furnace contains zirconium fluoride dust, the zirconium fluoride dust is recovered in two stages, comprising a first stage containing a cyclone and a second stage comprising a wet scrubber.

11. A process according to claim 1, wherein the exhaust from the fluidized bed furnace contains hydrofluoric acid, said exhaust gas is scrubbed with water in a scrubbing tower to remove hydrofluoric acid and the latter is recycled.

12. A process according to claim 1, wherein the evaporation of the solution and calcining of the resultant zirconium fluoride containing water of crystallization is carried out in one operation in the same fluidized bed oven.

13. A process according to claim 12, wherein said process is carried out at a temperature of 220°–300° C.

14. A process according to claim 13, wherein the process is carried out at a temperature of 240°–280° C.

15. A process according to claim 1, wherein the zirconium fluoride granules have a particle size of 0.2 to 4 mm.

* * * * *